United States Patent [19]
Steed

[11] 3,760,451
[45] Sept. 25, 1973

[54] COMBINATION WINDSHIELD WIPER AND WASHER

[76] Inventor: Marvin D. Steed, 2530 Adams Ave., S.W., Camden, Ark. 71701

[22] Filed: Nov. 30, 1971

[21] Appl. No.: 203,153

[52] U.S. Cl............ 15/250.02, 15/250.04, 239/304
[51] Int. Cl. ............................................. B60s 1/60
[58] Field of Search................... 15/250.01, 250.02, 15/250.04; 239/304, 307, 310, 284

[56] References Cited
UNITED STATES PATENTS

| 1,360,298 | 11/1920 | Johnston et al................ | 239/304 |
| 2,268,253 | 12/1941 | Hill et al......................... | 15/250.04 |
| 3,521,792 | 7/1970 | Davidson........................ | 239/304 X |
| 3,640,461 | 2/1972 | Koll................................ | 239/304 X |

FOREIGN PATENTS OR APPLICATIONS

| 1,189,759 | 3/1959 | France................... | 15/250.02 |
| 1,058,381 | 12/1957 | Germany................ | 15/250.02 |
| 1,204,371 | 9/1970 | Great Britain.......... | 239/284 |

*Primary Examiner*—Peter Feldman
*Attorney*—Harvey B. Jacobson

[57] ABSTRACT

A compact windshield wiper and washer assembly comprising a support bushing adapted to be mounted in said bushing and including a fluid passageway with inlet and outlet openings, a stationary chamber connected to water and detergent sources and communicating with said inlet opening by way of a rotatable seal, the outlet opening in said shaft communicating with a wiper arm dispensing tube with spray holes for squirting the liquid over the associated windshield area.

13 Claims, 7 Drawing Figures

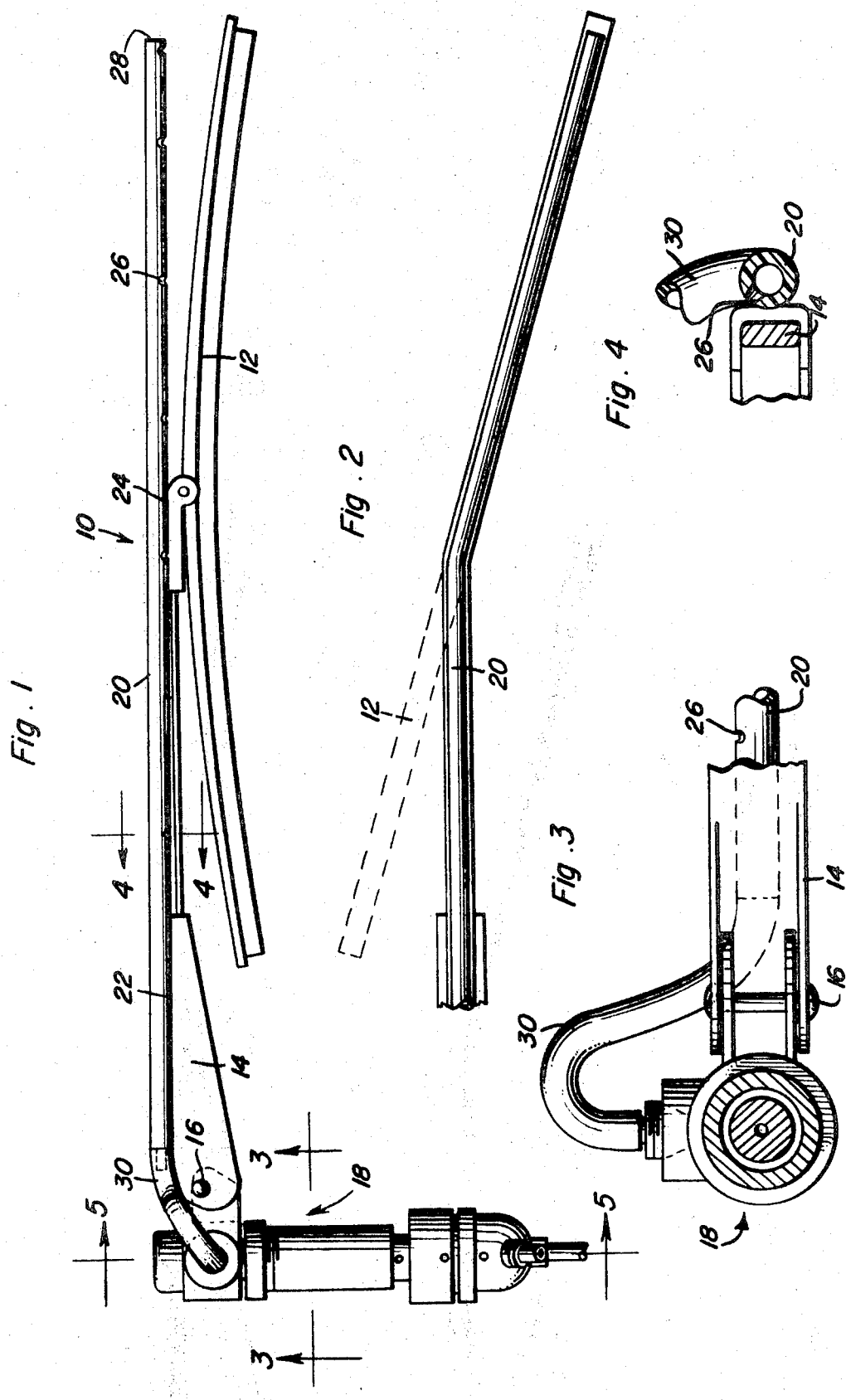

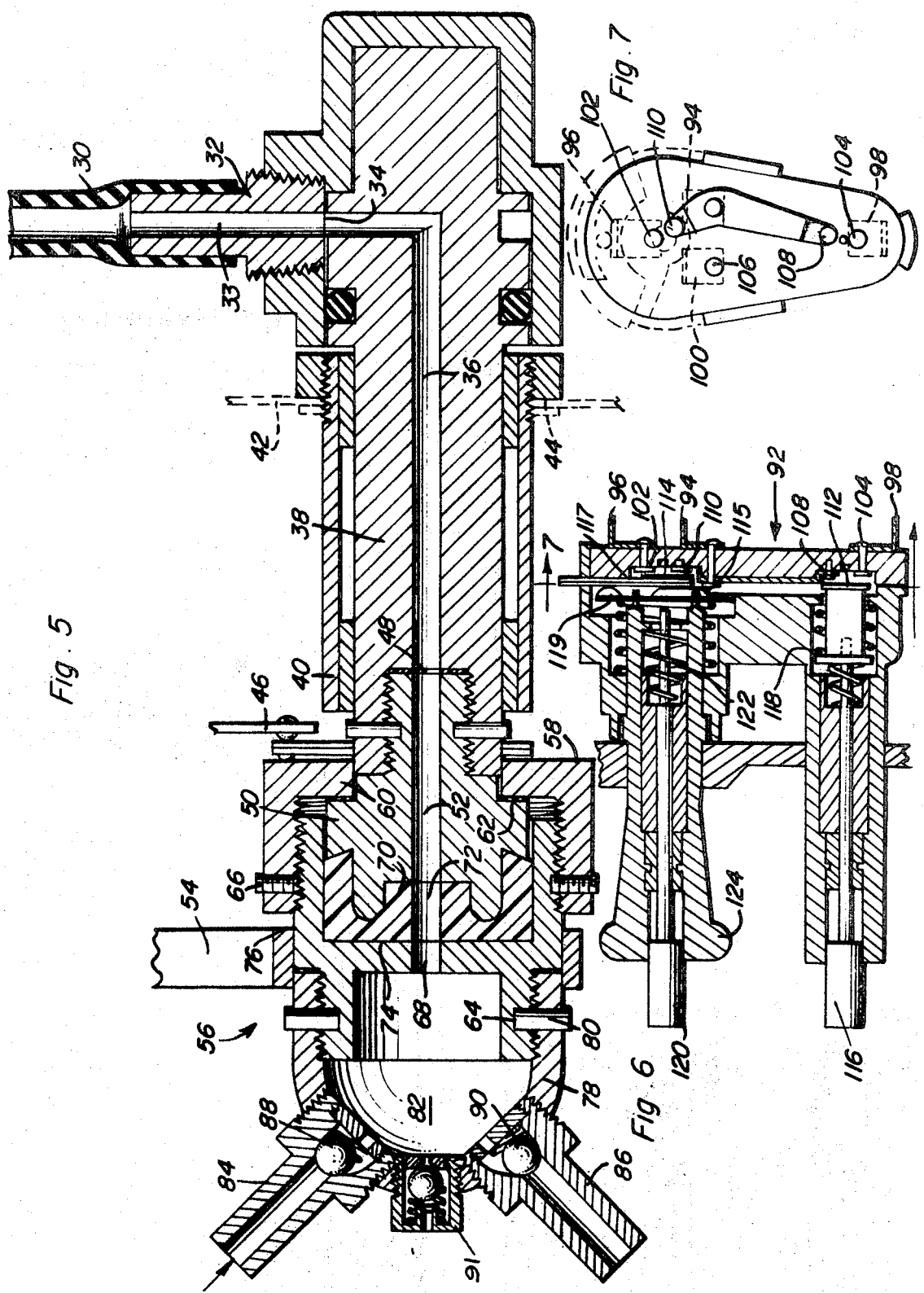

COMBINATION WINDSHIELD WIPER AND WASHER

The present invention is generally related to windshield washers and, more particularly, to vehicle windshield washers with wiper-mounted dispensing tubes.

In the past, various types of vehicle windshield washer assemblies have been proposed. The earliest types were provided with a squirter head or nozzle mounted to the vehicle's body panel immediately adjacent to the windshield. More recent designs have been provided with dispensing tubes which move with the wiper arms to dispense the cleaning fluid over the area covered by the wiper blades. This assures more uniform wetting of the windshield surfaces which significantly aids in the removal of dirt, bugs and other contaminants. However, both the earlier and recent designs have required additional mounting holes in the vehicle body panel to support the nozzle or to permit passage of liquid delivery tubes to the wiper arm. Such mounting holes increased the installation costs and were unsightly when installed on the more sleek body designs. Furthermore, such conventional constructions did not permit control over dispensing of the liquid detergent or soap, such being premixed with water in a single container. This resulted in the waste of detergent when cleaning windshields with contaminants normally removed by water alone.

It is an object of the present invention to provide a novel windshield washer assembly which includes a liquid dispensing tube affixed to the wiper arm and communicating with a liquid source through the wiper arm drive shaft, thereby eliminating the need for a separate hole in the vehicle panel for the passage of a liquid delivery tube.

Another object of the present invention is to provide a unique windshield washer assembly which includes a mixing chamber for water and detergent, both of which may be selectively pumped to the chamber as required to clean the windshield surfaces, thereby eliminating the unnecessary use and waste of the cleaning detergents.

It is a further object of the present invention to provide a versatile windshield washer assembly which is of compact construction, attractive in exterior appearance, and permits control over detergent dispensing, yet, is relatively inexpensive to manufacture.

FIG. 1 is a side elevational view of the windshield wiper and washer assembly of the present invention.

FIG. 2 is a partial plan view of the assembly shown in FIG. 1.

FIG. 3 is a sectional view taken along section 3—3 of FIG. 1.

FIG. 4 is a sectional view taken along section 4—4 of FIG. 1.

FIG. 5 is a sectional view taken along section 5—5 of FIG. 1.

FIG. 6 is a sectional view of the control switches associated with the assembly of the present invention.

FIG. 7 is a sectional view taken along section 7—7 of FIG. 6.

Referring now, more particularly, to FIGS. 1–4, the windshield wiper and washer assembly of the present invention is generally indicated by the numeral 10 and includes a conventional wiper blade 12 of rubber or similar materials mounted to a rigid wiper arm 14 which is pivotally connected at 16 to a wiper drive mechanism generally indicated by the numeral 18. A spring or similar biasing means may be provided in a conventional manner for pressing the blade against the windshield. A liquid dispensing tube 20 is affixed to the wiper arm at 22 and 24 by cement or other fastening means, not illustrated, and includes a plurality of longitudinally spaced dispensing holes 26 which are adapted to squirt the liquid onto the associated windshield areas. The remote end 28 of tube 20 is sealed, while the opposite end is connected to a flexible delivery tube 30 communicating with a source of liquid supply, as hereinafter explained.

Referring now, more particularly, to FIG. 5 the operation of the drive mechanism and fluid supply may be more fully appreciated. Fluid is fed to flexible delivery tube 30 by way of a threaded fitting 32 with a bore 33 extending therethrough and communicating with an outlet opening 34 associated with a liquid passage 36 formed in a rigid, elongated drive shaft 38. The drive shaft is rotatably mounted in a sleeve or bushing member 40 which is adapted to be connected to a panel 42 normally adjacent to the vehicle windshield. Preferably, bushing 40 is restrained against rotation relative to the vehicle panel by way of a lock nut 44, or similar fastening means. A drive coupling 46 is operatively connected to the drive shaft in order to impart rotation thereto in a manner well known. Passageway 36 is provided with a central or axial inlet opening 48 at one end of the shaft which is aligned with a rigid seal mounting member 50 with an axial bore 52 extending therethrough.

The mechanism may be further supported by way of a mounting bracket 54 which extends around a stationary housing generally indicated by the numeral 56. The stationary housing includes a threaded collar member 58 with an inwardly extending flange portion 60, in sealing engagement with a nylon washer 62. A collar 58 is connected to a threaded housing member 64 and may be fastened permanently thereto by way of set screws 66. Housing member 64 includes an aperture 68 communicating with axial bore 52 by way of rotating seal member 70.

Seal member 70 is made of resilient material, such as rubber or plastic, and includes a central bore 72 for the passage of liquid therethrough. Seal 70 is generally circular in shape and includes both flat and circumferential sealing surfaces at 74 and 76, respectively. By adjusting the tightness of collar 58, proper sealing engagement between rotatable seal 70 and stationary housing member 64 may be achieved, to provide substantially unhindered rotation of drive shaft 38. The resiliency and shape of seal member 70, together with nylon washer 62 assures against the escape of liquid from the system prior to reaching the squirter holes.

The stationary housing further includes a dome-like member 78 which is threadedly connected to housing member 64 and held permanently in place by set screws 80, or the like. Members 78, 64, together define a mixing chamber 82 communicating with water and detergent sources by way of threaded inlet fittings 84 and 86.

Each inlet fitting is connected to a liquid container and conventional fluid pump, not illustrated, which, when actuated, deliver the associated liquid to chamber 82 for mixing. Inlet fitting 84 and 86 are further provided with check valves 88 and 90, respectively, which are effective to prevent the backflow of either fluid from the mixing chamber. Thus, as the associated water and detergent pumps are energized, the liquids are delivered to chamber 82 where they are substantially mixed due to the angular offset between the inlet fittings. The pressure from the associated pumps is effective to advance the mixture through the passageways and associated seals to the dispensing tube 20 mounted on wiper arm 14. In addition, a drainage valve 91 may be provided to drain the chamber after pumping, the valve being automatically closed under the influence of the dynamic fluid pressure during pumping.

Referring to FIGS. 6 and 7, the control switches associated with the present invention may be seen in detail, and are generally indicated by the numeral 92. A main terminal 94 is adapted to be connected to a conventional vehicle battery, such as that normally utilized in a 12V, negative ground system. The switches are provided with a water and detergent pump terminals 96 and 98 and windshield wiper terminal 100, together with the associated stationary contacts 102, 104 and 106, respectively. Battery terminal 94 is internally connected to a pair of stationary contacts 108 and 110, through which power is delivered by way of bridging contacts 112 and 114, respectively.

Bridging contact 112 is connected to a push button actuator 116, depression thereof being effective to bridge contacts 108 and 104 to energize the detergent pump. A compression spring 118 is effective to return push button 116 to its original position. Similarly, depression of push button 120 is effective to bridge contacts 102 and 110 by way of leaf spring contact 114 to energize the associated water pump. Preferably, push button 120 is provided with a coil compression spring 122 which is effective to return the push button to its original position. A control knob 124 is connected to bridging contacts 115 and 119 to energize the wiper drive mechanism. If desired, the detergent and water pumps may be externally electrically interlocked or connected in series with the wiper mechanism, such that it is impossible to energize the pumps until the wiper mechanism has been turned on.

It will be appreciated that the switch assembly 92 is effective to selectively control the dispensing of water and detergent to the windshield surfaces. Such an arrangement eliminates the waste of detergent, and permits the use of concentrated detergents which do not have to be replenished as often. It should be noted that the exact locations of the contacts or their connection to the battery system may be varied somewhat.

From the foregoing description, it will be appreciated that the windshield washer and wiper assembly of the present invention provides an extremely compact construction which may be mounted through a single mounting hole formed in a vehicle windshield panel and permits control over the dispensing of both the detergent and water. Adjustment of the rotatable seal, together with the use of nylon washers between the fluid-carrying members assures against leakage when the drive shaft is stationary or rotating. The assembly of the present invention may be made from steel, plastics or other durable materials which are strong and long lasting. Furthermore, the assembly includes a relatively small number of moving parts and is economical to manufacture and install. Due to its compactness and configuration, it is possible to replace conventional windshield wiper assemblies with the assembly of the present invention, such involving a minimum amount of expense and labor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A wiper and washer assembly for vehicle windshields and the like, said assembly comprising an elongated drive shaft with a liquid passageway extending therethrough between inlet and outlet openings and being adapted to be operatively connected to a drive mechanism for rotation thereby, a wiper arm connected to said drive shaft adjacent said outlet opening, liquid dispensing means associated with said wiper arm communicating with the outlet opening of said liquid passageway, stationary liquid supply means communicating with the inlet of said liquid passageway, seal means between said rotatable drive shaft and said stationary liquid supply means to prevent leakage of liquid from said passageway during rotation of said shaft, said seal means including a resilient seal member connected to said shaft, said seal member being generally circular in shape with an axial bore therein in general alignment with the inlet opening of said passageway, said stationary liquid supply means including a stationary wall member in sealing and sliding engagement with said resilient seal member and including an outlet aperture aligned with said axial bore in said resilient seal member, and adjustment means associated with said shaft and said wall member for selectively adjusting the axial position of said shaft relative to said wall member to correspondingly adjust the compression sealing force of said seal member against said wall member, whereby wear on said seal member may be compensated for to maintain an adequate seal.

2. The structure set forth in claim 1 wherein said stationary wall member includes a cylindrical portion in wiping engagement with said seal member, said seal member including flat sealing surfaces in wiping engagement with the flat surfaces defined by the base of said cylindrical portion and curved circumferential surfaces in wiping engagement with the circumferential surfaces of said cylindrical portion.

3. The structure set forth in claim 2 wherein said stationary liquid supply means includes a mixing chamber adapted to communicate with water and detergent supplies.

4. The structure set forth in claim 3 wherein the inlet opening in said passageway is centrally located along the axis of rotation of said drive shaft.

5. The structure set forth in claim 4 wherein the outlet of said passageway is offset from the axis of shaft rotation.

6. The structure set forth in claim 1 wherein said adjustment means includes a collar member retentively fastened to said wall member and rotatably connected to said shaft.

7. The structure set forth in claim 6 wherein said device includes a secondary seal member disposed between said collar member and said shaft and allowing rotation therebetween.

8. The structure set forth in claim 6 wherein said collar is in threaded engagement with said wall member for selective axial movement relative thereto.

9. The structure set forth in claim 8 wherein said device includes a secondary seal member disposed between said collar member and said shaft and allowing rotation therebetween.

10. A wiper and washer assembly for vehicle windshields and the like, said assembly comprising a member with a fluid passageway extending therethrough, said passageway having inlet and outlet openings at opposite ends thereof, a stationary mixing chamber with an outlet aperture communicating with the inlet opening of said passageway, first inlet means connected to said chamber to provide a flow of detergent to said chamber, second inlet means connected to said chamber to provide a flow of water to said chamber, first and second pump means for delivering cleaning solution and water through said first and second inlet means into said chamber, control means for selectively controlling said first and second pump means to cause delivery of the cleaning agent and water respectively to said chamber, and drain valve means connected to said chamber for draining liquid therefrom subsequent to the pumping of liquid through said chamber to said passageway.

11. The structure set forth in claim 10 wherein said first and second inlet means includes check valve means for preventing backward flow of the cleaning solution or water from said chamber.

12. The structure set forth in claim 9 wherein said drain valve means is responsive to predetermined low pressure conditions of the liquid in said chamber to effect drainage thereof.

13. The structure set forth in claim 11 wherein said first and second inlet means comprise fittings with fluid passageways angularly offset from each other to aid in the mixing of cleaning agent and water within said chamber.

* * * * *